Aug. 25, 1936.   L. B. NEIGHBOUR   2,051,885
MANURE SPREADER
Original Filed Oct. 11, 1926   3 Sheets-Sheet 1
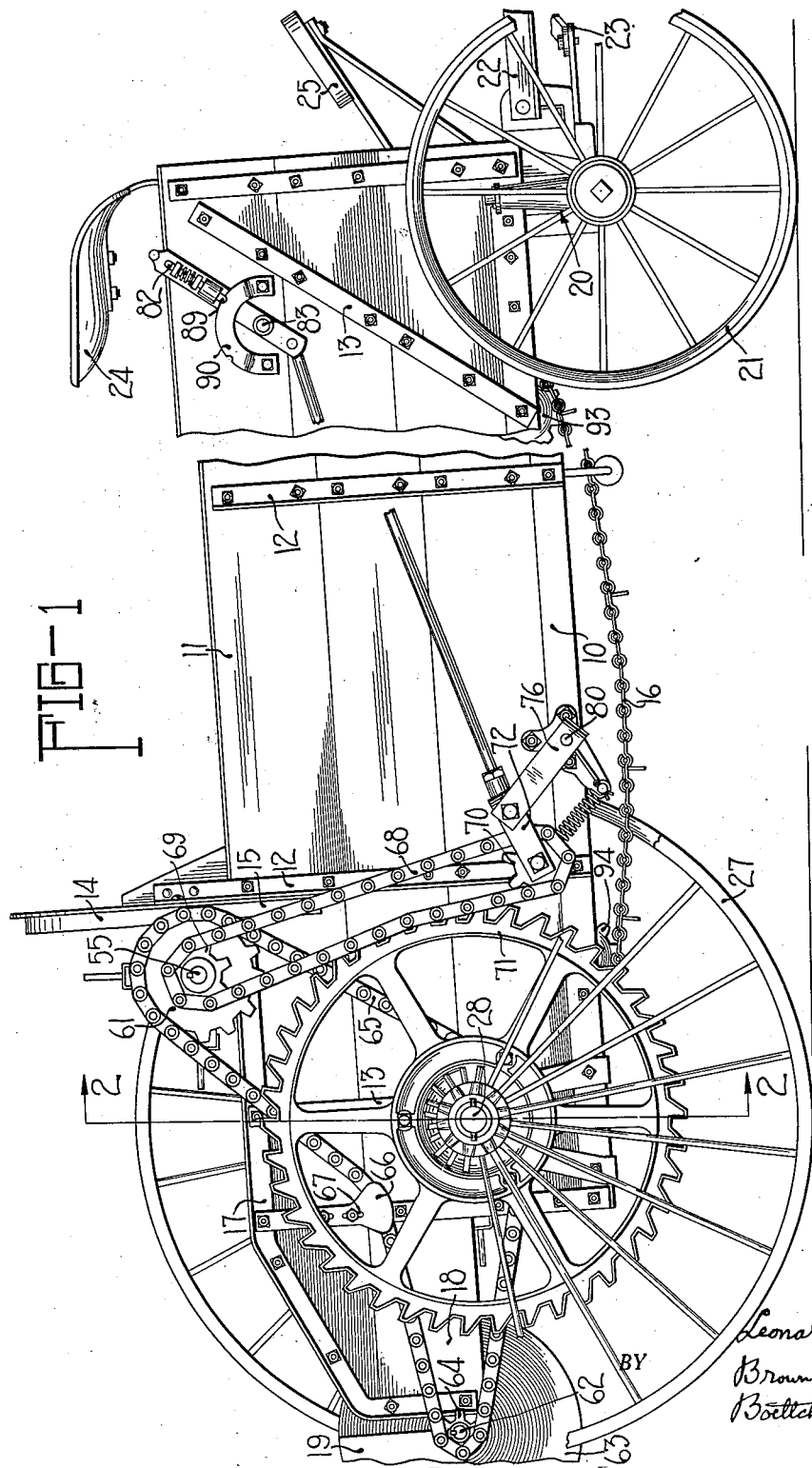
INVENTOR.
Leonard B. Neighbour
BY Brown, Jackson,
Boettcher + Dienner
ATTORNEYS.

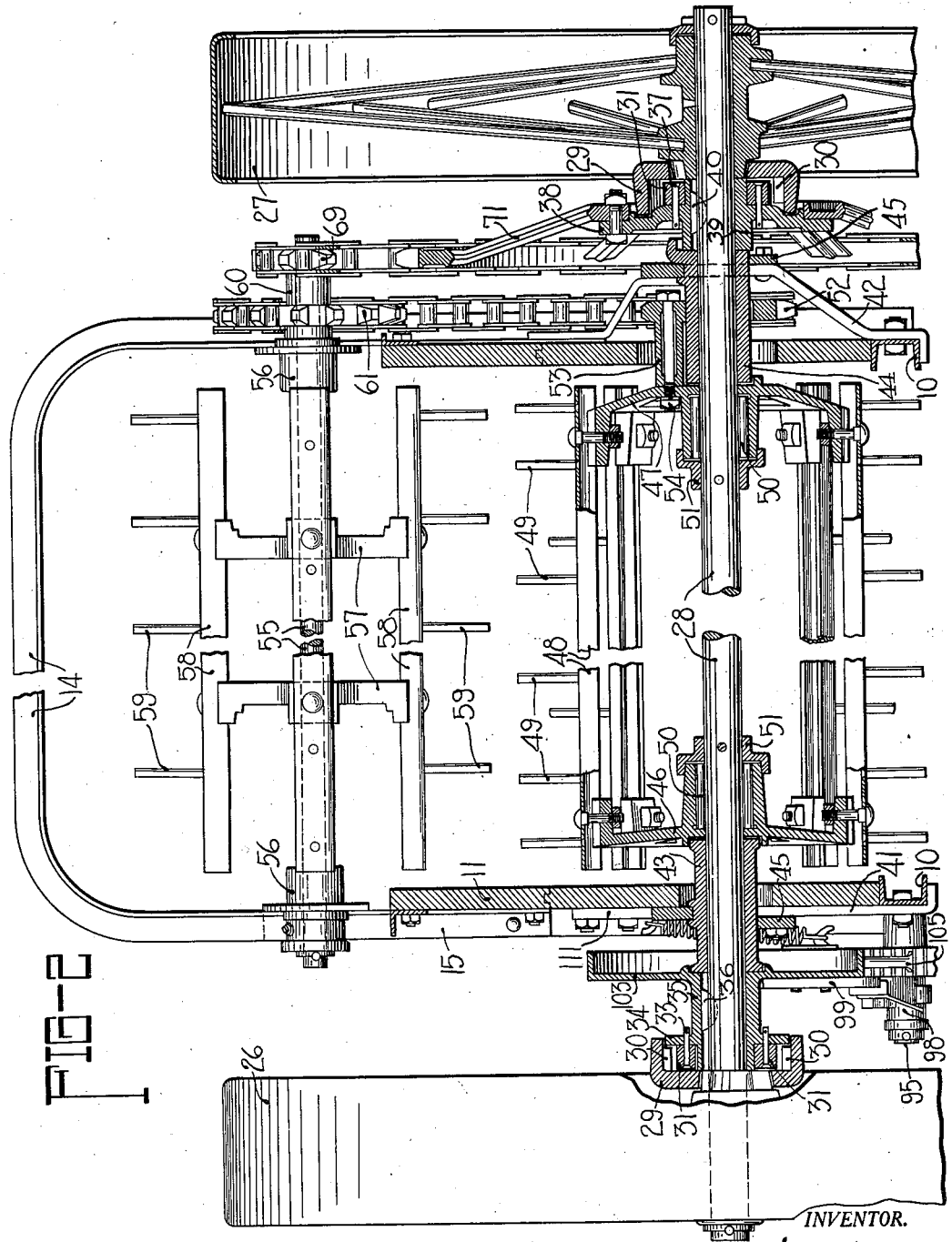

Aug. 25, 1936.　　　L. B. NEIGHBOUR　　　2,051,885
MANURE SPREADER
Original Filed Oct. 11, 1926　　3 Sheets-Sheet 3
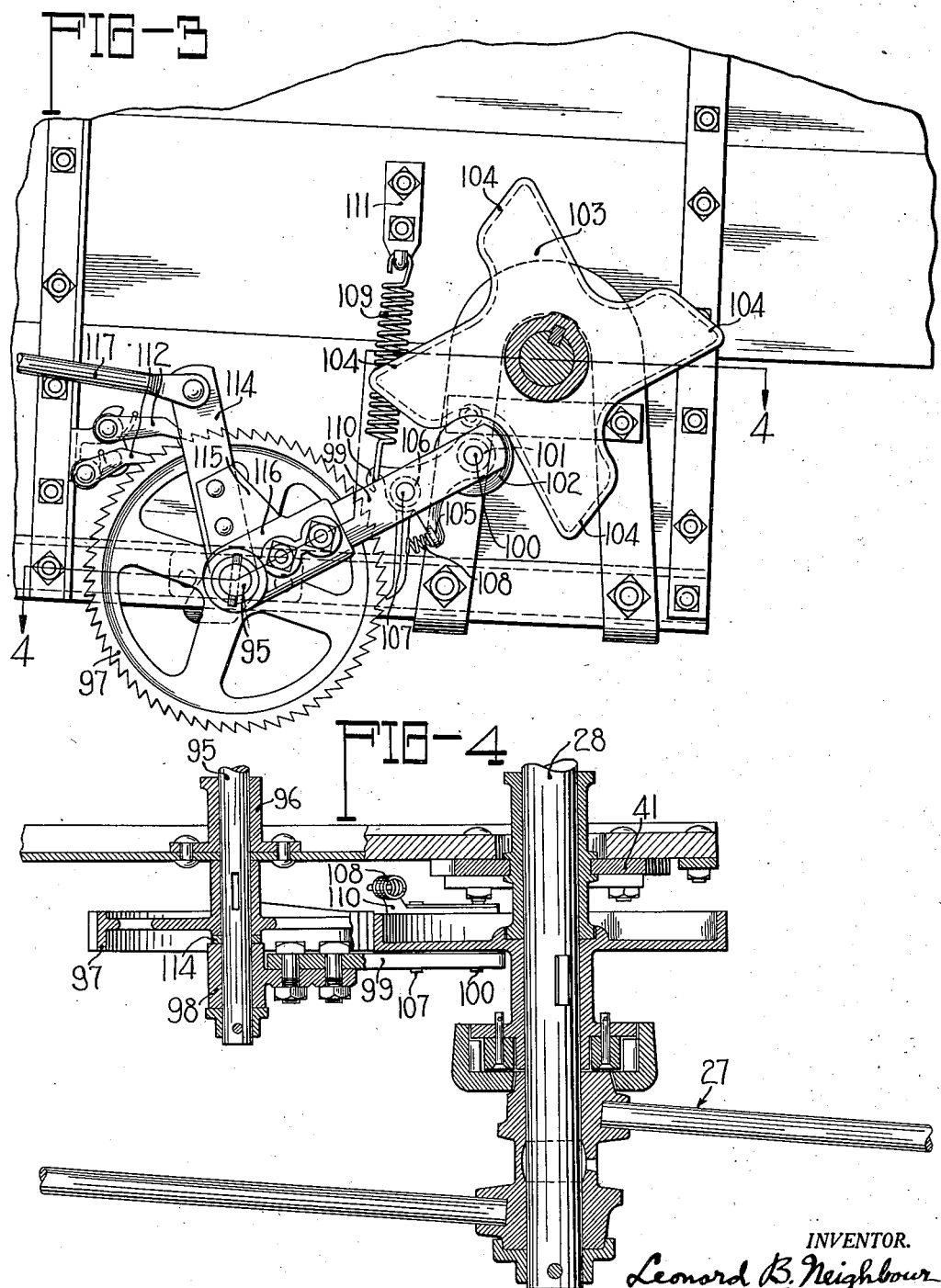
INVENTOR.
Leonard B. Neighbour
BY Brown, Jackson
Boettcher & Dienner
ATTORNEYS.

Patented Aug. 25, 1936

2,051,885

UNITED STATES PATENT OFFICE 2,051,885

MANURE SPREADER

Leonard B. Neighbour, Moline, Ill., assignor to Deere & Company, Moline, Ill., a corporation of Illinois Original application October 11, 1926, Serial No. 140,711. Divided and this application August 10, 1933, Serial No. 684,492

7 Claims. (Cl. 275—3)

This application is a division of my copending application, Serial No. 140,711, filed October 11, 1926, now issued as Patent No. 1,946,807, February 13, 1934.

My invention relates to manure spreaders of the well-known type comprising a vehicle body mounted on front and rear wheels, a traction driven rear axle on which the rear wheels are mounted and by the forward rotation of which the axle is driven, rotary beating and distributing apparatus mounted adjacent the rear end of the vehicle body, and a traveling conveyor, the upper course of which feeds the contents of the vehicle gradually rearwardly to the beating and distributing apparatus.

One of the features of my invention pertains generally to the means for driving the beating and distributing apparatus and the conveyor apparatus from the rear axle. In one representative embodiment of this type of spreader, the driving energy is obtained from a large driving sprocket at or near one end of the rear axle and which rotates with the rear axle, this driving energy being transmitted to a looped driving chain which has operative connection with the beating and distributing apparatus. The upper end of this looped chain usually passes over an upper driven sprocket wheel which is mounted on the axis of one of the beater cylinders, and engaging in the lower end of the chain is an idler member, generally constructed as a sprocket wheel, which is movably supported whereby the chain can be shifted fore and aft to bring one side of the chain into or out of engagement with the driving sprocket to establish or interrupt the transmission of power.

Another feature of the present invention is particularly concerned with the provision of beating and distributing apparatus embodying a beater mounted for rotation directly on the rear axle and contemplates arranging the axle supported beater so as to be driven from one end of the axle while the conveyor apparatus is driven from the other end of the axle, whereby the loads imposed on the driving axle are distributed. By this arrangement, the rear axle forms a support for the rear end of the body of the spreader and for the beater and also constitutes the drive for the beater and the conveyor apparatus. With the beater being driven from one end of the axle and the conveyor apparatus from the other end, the mid portion of the axle is never stressed in torsion beyond the degree necessary to drive either the conveyor apparatus or the beater.

Another feature of my invention pertains to the mechanism for producing the intermittent feed of the conveyor which feeds the load toward the beating and distributing apparatus. In this regard, one of the objects of the invention is to provide a construction wherein the ratchet wheel, the ratchet feed arm, and the feed adjusting means are concentrically mounted on a common axis. Another object is to dispose this common axis in advance of the rear axle and to impart feeding rotation to the ratchet wheel through a cam wheel mounted concentrically of and rotating with the rear axle.

These and other objects of my invention pertaining to particular details of construction of my improved machine will be apparent from the following description of a preferred embodiment thereof. In the drawings illustrating this embodiment:

Figure 1 is a side elevational view of the present manure spreader, showing that side of the machine on which the beater and distributor drive mechanism is disposed;

Figure 2 is a transverse sectional view through the entire machine, taken on the plane of the line 2—2 of Figure 1;

Figure 3 is a fragmentary detail view illustrating the conveyor feed mechanism; and Figure 4 is a sectional view taken approximately on the plane of the line 4—4 of Figure 3.

In the structure illustrated, the reference numeral 10 indicates sill members which are spaced apart and extend longitudinally of the machine, the sills forming the base for the load-carrying body and supporting its side walls 11. The latter are formed of boards, and are held in upright position and fastened together by vertical angle members 12 and brace members 13, which are secured to the sills 10 and the sides 11, as best shown in Figure 1.

The sides of the body are tied together at the top and further braced by an angle iron member 14 formed in the shape of an inverted U, the extremities 15 thereof projecting down along the exterior of the body and being secured thereto and to the upper portions of the rearmost angle members 12. The arch portion of the member 14 extends far enough above the side walls of the body to permit a heaped up load of material carried in the body to pass thereunder. The material carried in the body is caused to travel gradually rearwardly therein, when the machine is in operation, by an endless conveyor or apron 16 of a well known type, which operates in the lower portion of the body and may, in some instances, form the bottom thereof. The conveyor is operated by mechanism that will hereinafter be described.

An angle iron member 17 is secured to the top rear portion of each side of the body and extends back from the rearmost brace 13 and downwardly to support a rearward extension 18 of the upper part of the body and to form a support for a rotary spreading member 19 that will hereinafter be more specifically described.

The front portion of the body is supported upon an axle 20 upon the ends of which are suitably mounted dirigible wheels 21 (see Figure 1). The laterally movable draft tongue 22 is connected with the axle and the body and is arranged to have its lateral steering motion transmitted to the front wheels by linkage 23. A driver's seat 24 is secured to the forward portion of the body, and 25 is a footboard for the driver's feet.

Traction drive wheels 26 and 27, which furnish the power for driving the spreader mechanism, are mounted upon a rear axle 28 which extends transversely through the rear portion of the load-carrying body, the latter being supported from said axle in a manner that will be presently described. Secured to the hub of each drive wheel is a ratchet plate 29 provided with internal teeth 30 with which ratchet teeth dogs 31, actuated by springs or the like, cooperate, so that either wheel will transmit power upon forward motion, but will be ineffective to transmit power upon backward motion. As shown in Figure 2, the ratchet dogs for the wheel 26 are journaled upon pins 33 carried by a flange 34 of a sleeve 35, the latter preferably being secured to the axle 28 by a key 36. The ratchet dogs for the wheel 27 are journaled upon pins 37 carried by a flange 38 of a sleeve 39, the latter preferably being secured to the axle by a key 40.

With the construction described, the axle 28 and the sleeves 35 and 39 are driven in unison, both wheels furnishing driving power on straightaway travel, and, when a turn is being made, the power being furnished by the wheel traveling through the larger arc, the other wheel at such time being permitted to idle by reason of the ratchet mechanism above described. While the axle 28 in the structure illustrated is arranged to rotate, it would not be a departure from the spirit of the invention to secure the axle against rotation and permit the sleeves 35 and 39 to turn on the axle, although the structure shown in the drawings is considered preferable.

The load carrying body is supported from the rear axle by inverted U-shaped brackets 41 and 42, the lower ends of which are secured to the sill members 10, and the middle portions of which extend around bearing sleeves 43 and 44, respectively, mounted on the axle inwardly of the sleeves 35 and 39 (Figure 2), the brackets being fixed to the bearings by transverse straps. The bearing sleeves 43 and 44 extend through suitable openings provided therefor in the side walls of the body, and are held against rotation by their engagement with the U-shaped brackets 41 and 42 and by the transverse straps 45 that engage the flattened under sides of the bearing sleeves, these transversely extending straps being secured to and bracing the arms of the brackets 41 and 42.

Revolubly mounted on the rear axle between the bearing sleeves 43 and 44 and between the side walls of the body is a beating cylinder, sometimes referred to as a distributor, the function of which is to break up and distribute the manure as it is fed thereto by the conveyor 16. It comprises spaced heads or spiders 46 and 47 to which are secured longitudinally extending bars 48 provided with teeth 49 (see Figure 2). Rollers 50, mounted on the axle within the hubs of the spiders, provide anti-friction bearings for the cylinder, and the latter is held from shifting longitudinally of the axle by collars 51 pinned to the axle.

The beating cylinder is rotated through the medium of a sprocket 52 situated at one side of the body and which is provided with a plurality of inwardly extending lugs 53 that project through an opening in the side of the body. As best shown in Figure 2, these lugs are secured to the spider 47 by bolts 54.

Disposed in advance of and above the aforesaid main beating cylinder is a supplemental cylinder or beater which engages with the top portions of the load mass and coacts with the main beating cylinder to disintegrate and throw rearwardly the manure or other material comprising the load. This supplemental cylinder comprises a shaft 55 journaled in bearings 56 secured to the down-turned extremities 15 of the U-shaped member 14, the shaft having secured thereto spider heads 57 to which are fastened longitudinally extending bars 58 provided with radially projecting teeth 59. The shaft 55 has secured thereto, outside the vertical planes of the side walls of the body, a sleeve 60 on which is formed a sprocket 61 that is disposed in the same vertical plane as the sprocket 52 which drives the main beating cylinder.

As previously described, a rotary spreading device 19 is mounted at the rear of the spreader body and situated so that material thrown back by the aforesaid main and supplemental cylinders will fall thereupon and be scattered over a greater space laterally than the width of the machine. As shown in Figure 1, this lateral thrower or wide-spreading device comprises a shaft 62 journaled in suitable bearings secured to the down-turned portion of the angle members 17 and carrying spreading surfaces 63 which spiral outwardly with opposite helical twists from the median longitudinal line of the spreader body. The shaft 62 is rotated by a sprocket 64 which is secured to its outer end and is disposed in the same plane with the sprockets 52 and 61 so that a drive chain 65 trained over the sprockets 52, 61 and 64 will simultaneously drive the main beating cylinder, the supplemental cylinder, and the spiral, wide-scattering device, all in timed relation, depending upon the relative sizes of the sprockets. A chain tightener 66 is adjustably fastened to the side of the body, as at 67, to take up slack in the drive chain 65 and prevent its flopping.

The beating and distributing mechanism previously described is operated by a main drive chain 68 which is movably supported so that it serves both as a power transmitter and as a power interrupter or clutch. This main drive chain is trained around a sprocket 69 secured to the sleeve 60 at a point outside of the sprocket 61, and the lower looped end or bight of the chain is supported by an idler member, preferably in the form of a sprocket 70, which is mounted so as to be shiftable to carry the chain 68 into or out of engagement with the teeth of a main drive sprocket 71. As shown in Figure 2, this main drive sprocket is bolted to the flange 38 of the ratchet mechanism located at this side of the machine. The idler sprocket 70 is connected with the vehicle frame for swinging movement toward or from the driving sprocket by means of a swinging support comprising a U shaped member or yoke 72 and a U shaped member 76 pivoted to the frame, as more clearly shown and claimed in the application above identified, to which reference may be made for specific details.

The support for the idler sprocket is swung fore and aft about the stud 80 by means of a lever 82 pivoted at 83 upon the side wall of the vehicle body. Said lever is operatively connected with the swinging support just described for moving the looped chain 68 into and out of operative engagement with the driving sprocket 71. The lever 82 carries the usual latch operated dog 89 which is adapted to engage a notched sector 90 secured to the spreader body for holding the jointed arms 72, 76 in either operative or inoperative position.

As previously stated, the material within the body is moved rearwardly and into the path of the teeth of the beating cylinders by the endless apron or conveyor 16. At the front of the load-carrying portion of the body, the apron is trained around and supported by sprockets 93 (Figure 1), while at the rear of the body the apron is trained around and driven by sprockets 94 fastened on a shaft 95 (Figure 4) supported in bearing 96 secured to the sills of the body.

The means for rotating the shaft 95 by power from the axle 28 to move the apron rearwardly will now be described, reference being had to Figures 3 and 4. Secured to the shaft 95 at the side of the body is a wheel 97 having ratchet teeth on its periphery. Pivoted upon the shaft 95 and disposed outside of the ratchet wheel 97 is a sleeve 98 to which is secured an arm 99 provided at its outer end with a stud 100 having a bushing 101 upon which is journaled a roller 102. The sleeve 35, keyed to the rear axle, is provided with a web 103, the periphery of which is an irregular shape to form a series of cams 104 which are adapted successively to engage the roller 102 as the axle 28 turns.

Assuming that the roller 102 is in engagement with one of the cams 104 at the base thereof, as shown in Figure 3, the counterclockwise rotation of the sleeve and cams will press the arm 99 downwardly, the roller traveling along the face of the cam 104. A dog 105 which is pivoted upon a bushing 106 mounted upon a stud 107 carried by the arm 99, and which is pressed against the teeth of the wheel by a spring 108, will cause the wheel to rotate with the arm during its downward movement and, consequently, drive the shaft 95 and move the apron or conveyor 16 rearwardly of the body. When the roller travels off the end of the cam 104, the arm 99 is caused to swing upwardly into position to be engaged by the next succeeding cam by a spring 109, one end of which is suitably secured to the arm 99, as by a hook 110, and the other end of which is connected with a bracket 111 fastened to the side of the body. It is of course understood that during the upward or return swing of the arm, the dog 105 will ratchet over the teeth of the wheel 97. During such return movement of the arm 99, the wheel is held against reverse movement by spring-pressed dogs 112 secured to the side of the body and adapted to engage the ratchet teeth on the wheel 97. A plate connects the ends of the studs 100 and 107 serving to tie them together.

The amount of movement imparted to the wheel 97 upon each downward movement of the arm 99, and consequently the extent to which the apron 16 is moved toward the distributing mechanism, is governed by an adjustable feed control arm 114 which is pivoted on the shaft 95 between the wheel 97 and the sleeve 98, and has secured to it a shoulder 115 that is adapted to engage with an abutment 116 formed on the sleeve 98 to limit the upward swing of the arm 99.

It will be seen that if the feed control arm 114 is shifted in a clockwise direction from the position shown in Figure 3, the upward movement of the arm 99 will be limited by the abutment 116 engaging the shoulder 115, and the roller 102 will not rise to the point where it will be engaged by the bottom of the cams 104. Hence, for this setting of the feed control arm, the arm 99 will not be given a full stroke. By adjusting the position of the feed control arm, any desired feed less than the maximum may be obtained for the apron. When it is desired to discontinue the application of power to the feed mechanism that moves the apron, it is only necessary to shift the feed control arm 114 to a position where the roller 102 is entirely out of the path of the cams 104. An operating rod 117 is pivotally connected with the free end of the feed control arm and extends forwardly to a point within convenient reach of the driver where it may be connected with any suitable actuating means, such as a lever and notched sector (not shown) for holding it in any one of several positions.

It will be noted that by pivoting the ratchet feeding arm 99 and the feed regulating arm 114 on the same axis as the ratchet wheel 97 a very simple and compact construction is obtained. By placing this mechanism on the conveyor shaft 95, in front of the rear axle, the load weight thereof is well distributed on the wheels of the vehicle, and the feeding stroke of the feeding arm 99 is downward, which is also desirable. It will also be noted, particularly from Figure 2, that the drive for the beaters is taken from the sprocket 71 at the right end of the shaft 28 while the drive for the apron 16 is taken from the cam 103 at the other end of the shaft 28. This provides for more uniform application or distribution of the operating stress to which the shaft or driving axle 28 is subjected.

What I claim as my invention is:

1. In a manure spreader, the combination with a vehicle body having a traction driven rear axle, of a beater cylinder rotating concentrically of said rear axle between the side walls of said body, a sprocket wheel rotating concentrically with said rear axle outside of said vehicle body, tubular lugs extending laterally from said sprocket wheel through an opening in said vehicle body, said lugs engaging with said beater cylinder, bolts passing through said tubular lugs for securing said sprocket wheel to said cylinder, and means for driving said sprocket wheel from said rear axle.

2. In a manure spreader, a vehicle body having a traction driven rear axle, a driving wheel mounted thereon and provided with a laterally inwardly disposed ratchet plate, a sleeve fixed to the axle outside of the vehicle body adjacent said plate and provided with a ratchet dog for cooperation with said ratchet plate, a driving gear fixed to said sleeve, a beater cylinder rotating concentrically of said rear axle between the side walls of said body, a member fixedly connected with the beater and extending to the outside of the vehicle body, and a driving connection between said driving gear and said member.

3. In a manure spreader, a vehicle body having a rear axle, a beater cylinder rotating concentrically of said rear axle between the side walls of the body, a member fixedly connected with the beater cylinder and extending to the outside of the innermost plane of one wall of the vehicle body, said member having sprocket teeth thereon at the outer end thereof, a wide spread rotating about an axis spaced rearwardly of said rear axle, a driving sprocket fixed to said wide spread, and a driving chain trained over said sprocket and said sprocket teeth.

4. In a manure spreader, the combination with a vehicle body having a traction driven rear axle, of a beater cylinder rotating concentrically of said rear axle between the side walls of said body, a sprocket wheel rotating concentrically with said rear axle outside of the innermost plane of one of the walls of said vehicle body, means extending laterally from said sprocket wheel through an opening in said vehicle body and connecting with said beater, and means for driving said sprocket wheel from said rear axle.

5. In a manure spreader, a vehicle body including sills and side walls carried thereby, a rear axle, bearings in which said axle is journaled, means supporting said vehicle body upon said bearings, said means comprising a bracket connected with the sill at one side of the body and to one of said bearings, a beater cylinder rotatably mounted upon said axle between the side walls of the body, a member fixedly connected with the beater cylinder and extending to the outside of the innermost plane of the side wall at said one side of the body, said member embracing said one of said bearings and having sprocket teeth at the outer end thereof disposed between said innermost plane and the outer end of said one bearing, a supplemental beater rotatably mounted between the sides of said body, a sprocket fixed to said beater in the plane of the sprocket teeth on said member, and a driving chain trained over said latter sprocket and the sprocket teeth on said member.

6. In a manure spreader, the combination with a vehicle body having a rear axle and generally cylindrical members supporting the body on said axle, of a beater cylinder rotating concentrically of said rear axle between said members and also between the side walls of said body, a sprocket wheel rotating concentrically with said rear axle generally outside of the vehicle body at the rear end thereof, means extending laterally from said sprocket wheel through an opening in said vehicle body and at least partially embracing the associated cylindrical supporting member to establish a connection between the sprocket wheel and said beater, and means for driving said sprocket wheel from said rear axle.

7. In a manure spreader, the combination with a vehicle body having a rear axle, of a beater cylinder rotating concentrically of said rear axle between the side walls of said body, a sprocket wheel rotating concentrically with said rear axle outside the innermost plane of one wall of the vehicle body, means separate from the beater and extending laterally from said sprocket wheel concentrically of said axle through an opening in said vehicle body and connecting with said beater, and means for driving said sprocket wheel from said rear axle.

LEONARD B. NEIGHBOUR.